United States Patent Office 3,773,756
Patented Nov. 20, 1973

3,773,756
NOVEL PREPARATION OF SUBSTITUTED
COBAMIDES
Lucien Penasse and Pierre Barthelemy, Paris, France, assignors to Roussel-UCLAF, Paris, France
No Drawing. Filed Oct. 4, 1971, Ser. No. 186,482
Claims priority, application France, Oct. 6, 1970, 7035985
Int. Cl. C07d 55/62
U.S. Cl. 260—211.7          10 Claims

ABSTRACT OF THE DISCLOSURE

A process for the preparation of analogs of vitamin $B_{12}$ wherein a hydrocarbon radical R is attached to the cobalt atom by reacting a Co—Z cobamide wherein Z is an anion-forming group with a metallic or metalloid derivative of R.

STATE OF THE ART

The well known structure of vitamin $B_{12}$ is a complex molecule having a central cobalt atom joined to different groups, one of which is cyano by covalent or semi-polar bonds of the formula

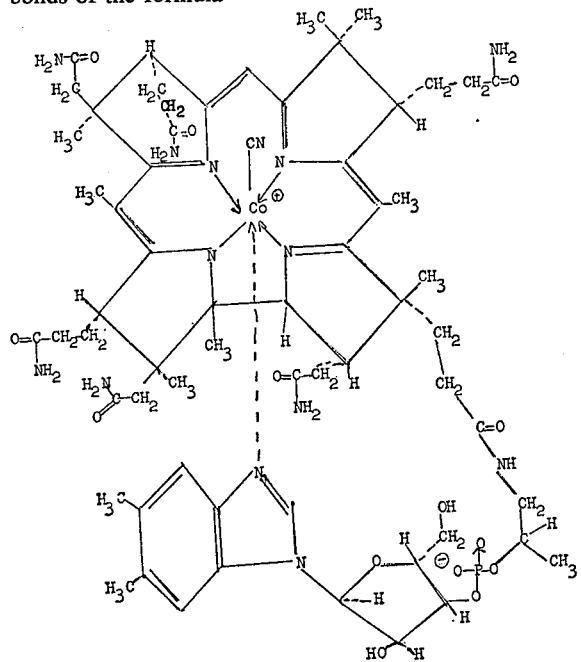

Numerous analogs of vitamin $B_{12}$ in which the molecule is modified are also known. In the nucleotide fragment, the base (5,6-dimethyl-benzimidazole, in the case of vitamin $B_{12}$) may, for instance, be replaced by another heterocyclic base, such as the 5-hydroxy-benzimidazole, 5-methoxy-benzimidazole, naphthimidazole, adenine, 2-methyladenine, xanthine, hypoxanthine, 2-methylpoxanthine, or guanine. The phosphate group may be bound to different carbons of the ribose fragments. The isopropylamino fragment may be replaced by another alkylamino chain. The nucleotide fragment may be absent as in cobinamide or factor B, or replaced by a CN— or OH group. The amide groups CO—NH$_2$ may be converted into carboxylic groups that may be esterified or transformed to other amides.

The cyano group may be replaced by a group, such as a hydroxyl radical, a halogen such as chloro-, bromo-, or iodo- a sulfito-, nitrito-, thiocyanato-, cyanato group, an NH$_3$ group or histidine group or a substituted or unsubstituted hydrocarbon radical, such as methyl or 5'-desoxy-adenosyl. The cobalt atom can also be in the form of its various natural or synthetic isotopes.

All above named compounds are described in works about vitamin $B_{12}$ and its analogs, as well in various public documents. These compounds are designated herein by the general term "Co—Y cobamides" or "Y-substituted cobamides," and the two expressions are equally applied when the amide groups of the considered molecule were modified.

In these expressions, Y is particularly the cyano group or one of the groups mentioned above as being able to substitute for CN.

Among the "Co—Y cobamides," the "Co—R' cobamides," wherein R' is a hydrocarbon radical bound to the cobalt atom by a carbon cobalt bond to be particularly mentioned. These compounds which have already been described in the literature are endowed with interesting biological properties. The "Co—R' cobamides" generally and particularly methyl cobalamine, have been used in experimentation and therapy connected with the metabolism of vitamin $B_{12}$, particularly in regard to the methyl cobalamine in anabolic process, connected with the biosynthesis of methionine.

The "Co—R' cobamides" have been up to the present prepared by reduction of a "Co—Y cobamide," particularly of a hydroxo cobamide (Y=OH) followed by reaction with an alkylating agent generating R'$^+$ cations. This reaction sequence may be represented, considering the reduction as a gain of electrons ($e^-$), by the following scheme:

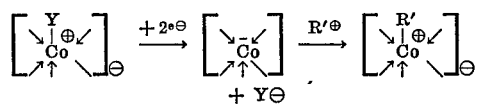

Such a process is described in the French Pat. 1,450,375 and in the German Pat. 1,213,842.

Wagner et al. (Ann. N.Y. Acad. Sci. [1964], pages 580–589) have shown that the alkylation of the cobalt of corrinoids with an alkyl anion is possible. Likewise, these authors have carried out methylation of the cobalt atom of the heptaethyl ester of dicyano-cobyrinic acid with methyl magnesium iodide and with methyl lithium using as solvent an ether-tetrahydrofuran mixture.

It is important to note that the heptaethyl ester of dicyano-cobyrinic acid is soluble in organic solvents, such as ether-tetrahydrofuran mixtures, so that Wagner et al. used very reactive organo-metallics such as magnesium or lithium compounds. However, the reaction described by these authors is not limited to the alkylation of cobalt, but it is observed that the ester groups of the molecule are also attacked and transformed to tertiary alcohols.

OBJECTS OF THE INVENTION

It is an object of the invention to provide a novel process for the preparation of substituted cobamides by a selective alkylation.

It is another object of the invention to provide a novel process for alkylating the cobalt atom of cobamides in high yields.

These and other objects and advantages of the invention will become obvious from the following detailed description.

THE INVENTION

The novel process of the invention for the preparation of Co—R cobamides wherein R is alkyl optionally substituted with a member of the group consisting of aryl, hydroxy and carboxylic comprises reacting a Co—Z cobamide wherein Z is an anion-forming group with a compound selected from the group consisting of an organometallic and organo-metalloid compound wherein the organo is R to obtain selective alkylation of the cobalt atom.

Organo-metallic or organo-metalloid derivatives are known to be very reactive and liable to react with numerous functional groups of organic molecules. Since vitamin $B_{12}$ and its analogs are complex molecules having a great number of centers liable to react with organo-metallic and organo-metalloid derivatives, the organo-metallics indicated by Wagner et al. cannot be used. Besides, as the Co—Z cobamides are mainly soluble in water and lower alkanols, the use of the organo-metallics of Wagner et al. is prohibited as they would be decomposed by the solvent. It is therefore surprising that the present process results in selective alkylation of the cobalt atom of the cobamides without reacting with other reactive centers of the molecule. The process is extremely simple and the yields are high. Selective alkylation means forming a cobalt-carbon bond between the group R and the cobalt atom.

Examples of suitable groups of R are alkyl of 1 to 10 carbon atoms such as methyl, ethyl, propyl, butyl, pentyl, hexyl, octyl, heptyl, and nonyl; alkyl of 1 to 10 carbon atoms substituted with hydroxy or carboxyl such as β-hydroxyethyl and carboxymethyl; and alkyl of 1 to 4 carbon atoms substituted with a monocyclic aryl radical, particularly phenyl, such as benzyl and phenethyl.

Examples of suitable groups of Z in the starting Co—Z cobamide are hydroxy, sulfito, cyano, cyanato, thiocyanato, nitrito, chlorine, bromine, iodine and radicals of the type 5'-desoxy adenosyl.

The reaction is effected in a solution or suspension in a solvent for the Co—R cobamides. These solvents are mainly water and lower alkanols, preferably methanol and ethanol. Therefore, the organo-metallic or organo-metalloid reagents should be soluble in water or lower alkanols and not react with the said solvents and should further be able to split the Co—Z bond without reacting with other functional groups of the cobamide molecule.

Suitable organic reactants are derived from metals or metalloids of the group consisting of mercury, gallium, thallium, silicon, boron, germanium, tin, lead and bismuth. The derivatives are preferably of the type M—(R)$n$ wherein M is a metal or metalloid atom of the above group, R is defined as above and n is the valence of metal or metalloid. The derivatives may also be of the mixed type where the metal or metalloid atom are further bound to one or more anoinic residues such as halides, nitrates or sulfates of metallic or metalloid alkyls. Coordination derivatives which certain compounds form with ammonia or amines such as gallium derivatives of the type $(R)_3Ga.NH_3$ and $(R)_3Ga.N(CH_3)_3$ may also be used.

When a mercury derivative is used, particularly derivatives $(R)_2Hg$, the mixed derivatives of the formula RHgX, where X is for example a halogen atom, a nitrate anion or a sulfate and R is defined as above are employed. Examples of these compounds are iodides, bromides or nitrates of mercuric methyl, mercuric ethyl, mercuric butyl, halides of mercuric alkyl whose alkyl radical is substituted with a hydroxy group such as bromide of mercuric β-hydroxyethyl and halides of mercuric aralkyl such as benzyl mercuric iodide.

In an analogous manner, the derivatives of gallium of the type $(R)_2.GaX$ or $RGaX_2$ or the derivatives of thallium $(R)_2TlX$ and $RTlX_2$, the derivatives of germanium $(R)_3GeX$, $(R)_2GeX_2$ or $(R)GeX_3$, the derivatives of tin such as $(R)SnX_3$, $(R)_2SnX_2$, $(R)_3SnX$, etc., can be used where R and X are defined as above. Numerous compounds of this type are described in the literature and their properties discussed, for example in the work of Rochow et al. [The Chemistry of Organo-metallic Compounds, John Wiley & Sons, Inc., New York (1957)].

In the case of boron derivatives, the boron trialkyls are particularly suitable. In the case of silicon derivatives preferably the derivatives are of the type $(R)SiF_5(NH_4)_2$ or $(R)SiF_6(NH_4)_3$ which may be prepared by the method described by Muller et al. [Chem. Berichte, 98, 235 (1965) and 98, 241 (1965)]. Thus, to prepare the Co-methyl cobalamine, particularly the ammonium methylpentafluorosilicate or the ammonium methyl hexafluorosilicate are used.

If it is desired to carry out the reaction in suspension, it is done in a solvent inert to the reaction products and more particularly, a solvent in which the organo-metallic or organo-metalloidal reagent are soluble and the cobamide is insoluble, such as hexane, xylene or methylene chloride. If the metal or metalloid reagent is easily oxidized, the reaction is carried out in an inert gas atmosphere such as nitrogen.

The selection of the reaction temperature depends mainly upon the reactivity of the selected R metal or R metalloid reagent and its thermal stability. It may, therefore, be necessary, depending on the case, either to cool or to heat the reaction mixture. Preferably, the reaction is carried out between about 0° C. and 100° C.

The isolation of the CO—R cobamides obtained by the process is effected by the usual methods used in the chemistry of vitamin $B_{12}$ and its analogs. It is, for instance, possible to recover the products with chromatography on columns packed with cellulose or modified cellulose such as carboxymethyl cellulose or diethylaminoethyl cellulose, by extraction of aqueous solutions thereof with phenol or a mixture of phenol and a chlorinated solvent or by precipitation from the aqueous solutions by additional acetone or other organic solvents.

Since the cobamides are generally affected by light as well as certain organo-metallic or organo-metalloids, it is recommended to effect the reaction and the extraction and isolating operations protected from day light or in diminished light.

In the following examples there are described several preferred embodiments to illustrate the invention. However, it should be understood that the invention is not intended to be limited to the specific embodiments.

EXAMPLE I

Preparation of methyl cobalamine 8 g. of hydroxo cobalamine were dissolved in 1000 ml. of methanol and then, after 1.4 g. of iodine were added thereto, the mixture was held at 65° C. for 3 hours. 50 g. of methyl mercuric iodide were then added to the resulting solution of iodo cobalamine and the mixture was heated to 65° C. for 3 hours and then evaporated to dryness under reduced pressure. The residue was washed with acetone, dried and then was taken up in 250 cc. of water. The mixture was filtered to remove the insoluble fraction and the aqueous filtrate was then passed through a column of diethylaminoethylcellulose and then a column of carboxymethyl cellulose to remove impurities and unreacted starting materials. The said columns were washed with water and the combined aqueous solutions were concentrated to a volume of 180 ml. 1800 ml. of acetone were added to the aqueous solution and the mixture was allowed to stand overnight at room temperature. The resulting precipitate was recovered by filtration and was dried to obtain 1.81 g. of methyl cobalamine or methyl 5,6-dimethyl benzimidazole cobamide solvated with water. From the carboxymethyl cellulose column 2.87 g. of the starting product in the form of hydroxo cobalamine were recovered.

Using the above procedure, ethyl mercuric iodide and β-hydroxyethyl mercuric bromide were reacted with iodo cobalamine to form Co-ethyl cobalamine and Co-β-hydroxyethyl cobalamine, respectively.

EXAMPLE II 5 gm. of hydrated hydroxo cobalamine (corresponding to 3.9 gm. of anhydrous product) were dissolved in 250 ml. of water, and 5 gm. of amonium methyl hexafluorosilicate were added thereto. The mixture was held for two hours at 50° C. with agitation and then was cooled to room temperature. The reaction mixture was extracted with 300 ml. of a 1:3 phenol-dichloroethane mixture. Then 625 ml. of acetone were slowly added followed by 22 ml. of water while stirring. Agitation was continued for one hour and then the precipitate was isolated by filtration and dried under reduced pressure to obtain 4 gm. of crude methyl cobalamine.

3.5 gm. of the said crude product were dissolved in 200 ml. of a 1:1 water/acetone mixture and after 900 ml. of acetone were slowly added, the mixture was left standing overnight at room temperature. The resulting crystalline product was isolated by filtration and dried under reduced pressure to obtain 3.43 gm. of 3.3% hydrated methyl cobalamine corresponding to 3.32 gm. of anhydrous product.

EXAMPLE III 100 mg. of 5'-desoxyadenosyl 5,6-dimethyl-benzimidazole cobamide were dissolved in 5 ml. of water and 100 mg. of ammonium methylhexafluorosilicate were added thereto. The mixture was held for two hours at 50° C. with agitation and then was cooled to room temperature to obtain a solution of methyl cobalamine which was purified by chromatography as in Example I.

Various modifications of the process and compositions of the invention may be made without departing from the spirit or scope thereof and it should be understood that the invention is intended to be limited only as defined in the appended claims.

We claim:

1. A process for the preparation of Co—R cobamides wherein R is alkyl of 1 to 10 carbon atoms, hydroxy alkyl of 1 to 10 carbon atoms, alkyl of 1 to 10 carbon atoms substituted with carboxyl and phenyl alkyl of 1 to 4 alkyl carbon atoms which comprises reacting a Co—Z cobamide wherein Z is an anion-forming group with a compound selected from the group consisting of an organo-metallic and organo-metalloid compound wherein the organo is R and the metal or metalloid is selected from the group consisting of mercury, gallium, thallium, silicon, boron, germanium, lead, tin and bismuth.

2. The process of claim 1 wherein Z is selected from the group consisting of hydroxy, sulfito, cyano, cyanato, thiocyanato, nitrito, chlorine, bromine, iodine and 5'-desoxy adenosyl.

3. The process of claim 1 wherein the metal or metalloid is selected from the group consisting of boron, silicon and mercury.

4. The process of claim 1 wherein the Co—Z cobamide is reacted with a compound of the formula $RHg X$ wherein R is as defined in claim 1 and X is a halogen atom.

5. The process of claim 1 wherein the Co—Z cobamide is reacted with a compound selected from the group consisting of $RSiF_6(NH_4)_3$ and $RSiF_5(NH_4)_2$ wherein R is as defined in claim 1.

6. The process of claim 1 wherein R is methyl.

7. The process of claim 1 wherein Co—Z cobamide is selected from the group consisting of iodo cobalamine and hydroxo cobalamine and it is reacted with methyl mercuric iodide.

8. The process of claim 7 wherein the reaction is effected in a methanol solution.

9. The process of claim 1 wherein Co—Z cobamide is selected from the group consisting of hydroxo cobalamine and dimethylbenzimidazol cobamide coenzyme and it is reacted with ammonium methyl hexafluorosilicate.

10. The process of claim 9 wherein the reaction is effected in an aqueous solution.

References Cited

UNITED STATES PATENTS

| | | | |
|---|---|---|---|
| 3,459,735 | 8/1969 | Murakami et al. | 260—211.7 |
| 3,474,087 | 10/1969 | Harris | 260—211.7 |
| 3,626,018 | 12/1971 | Taylor | 260—211.5 R |

LEWIS GOTTS, Primary Examiner

J. R. BROWN, Assistant Examiner